US010410284B1

(12) United States Patent
Cordova et al.

(10) Patent No.: US 10,410,284 B1
(45) Date of Patent: Sep. 10, 2019

(54) TRADING MONEY MARKET INSTRUMENTS

(71) Applicant: Global Liquid Markets, LLC, Palo Alto, CA (US)

(72) Inventors: Jeff Cordova, Palo Alto, CA (US); Glenn Havlicek, Westport, CT (US)

(73) Assignee: Global Liquid Markets, LLC, Palo Alto, CA (US)

( * ) Notice: Subject to any disclaimer, the term of this patent is extended or adjusted under 35 U.S.C. 154(b) by 222 days.

(21) Appl. No.: 13/835,884

(22) Filed: Mar. 15, 2013

(51) Int. Cl.
*G06Q 40/04* (2012.01)

(52) U.S. Cl.
CPC .................... *G06Q 40/04* (2013.01)

(58) Field of Classification Search
CPC ........ G06Q 40/00; G06Q 40/02; G06Q 40/04; G06Q 40/06
USPC ........................................................... 705/37
See application file for complete search history.

(56) References Cited

U.S. PATENT DOCUMENTS

| 6,421,653 | B1 * | 7/2002  | May ............................. 705/36 R |
| 7,734,533 | B2 * | 6/2010  | Mackey, Jr. ............ G06Q 40/04 705/37 |
| 7,849,000 | B2 * | 12/2010 | Mackey, Jr. ............ G06Q 40/04 705/37 |
| 8,392,314 | B1 * | 3/2013  | Epstein .................. G06Q 40/04 705/35 |
| 8,458,898 | B2 * | 6/2013  | Wild ............................... 29/828 |
| 2008/0162334 | A1 * | 7/2008 | Hausman ........................ 705/37 |
| 2008/0249956 | A1 * | 10/2008 | Connors ................ G06Q 40/00 705/36 R |
| 2012/0317053 | A1 * | 12/2012 | Gartland ............... G06Q 40/04 705/36 R |

FOREIGN PATENT DOCUMENTS

WO    WO-2007056553 A2 *    5/2007    ............. G06Q 40/02

OTHER PUBLICATIONS

Reference Code: 81B38051-16EC-4561-82A5-4C84FEE2BF60 Publication Date: Mar. 19, 2015 www.marketline.com Copyright Marketline. This Content is a Licensed Product and is Not to Be Photocopied or Distribute.*

* cited by examiner

*Primary Examiner* — Richard C Weisberger
(74) *Attorney, Agent, or Firm* — Bryan Cave Leighton Paisner LLP

(57) ABSTRACT

Improved techniques for trading money market instruments are disclosed. In some embodiments, a first view comprising consolidated real time data corresponding to a plurality of money market instruments is provided. In response to receiving a selection of a prescribed money market instrument via the first view, a second view comprising bids currently available for the selected money market instrument is provided. In response to receiving a selection of a bid via the second view, an interface for negotiating and possibly consummating a trade corresponding to the selected bid is provided, wherein the interface for negotiating and possibly consummating the trade is provided based on a determination that counterparties involved in the trade are qualified to engage in the trade.

16 Claims, 5 Drawing Sheets

TRADING MONEY MARKET INSTRUMENTS

BACKGROUND OF THE INVENTION

Trading between institutional investors and funding managers is typically mediated by human voice brokers and as a result is highly inefficient. Therefore, improved techniques for facilitating trades between counterparties are needed.

BRIEF DESCRIPTION OF THE DRAWINGS

Various embodiments of the invention are disclosed in the following detailed description and the accompanying drawings.

DETAILED DESCRIPTION

Figure 1:
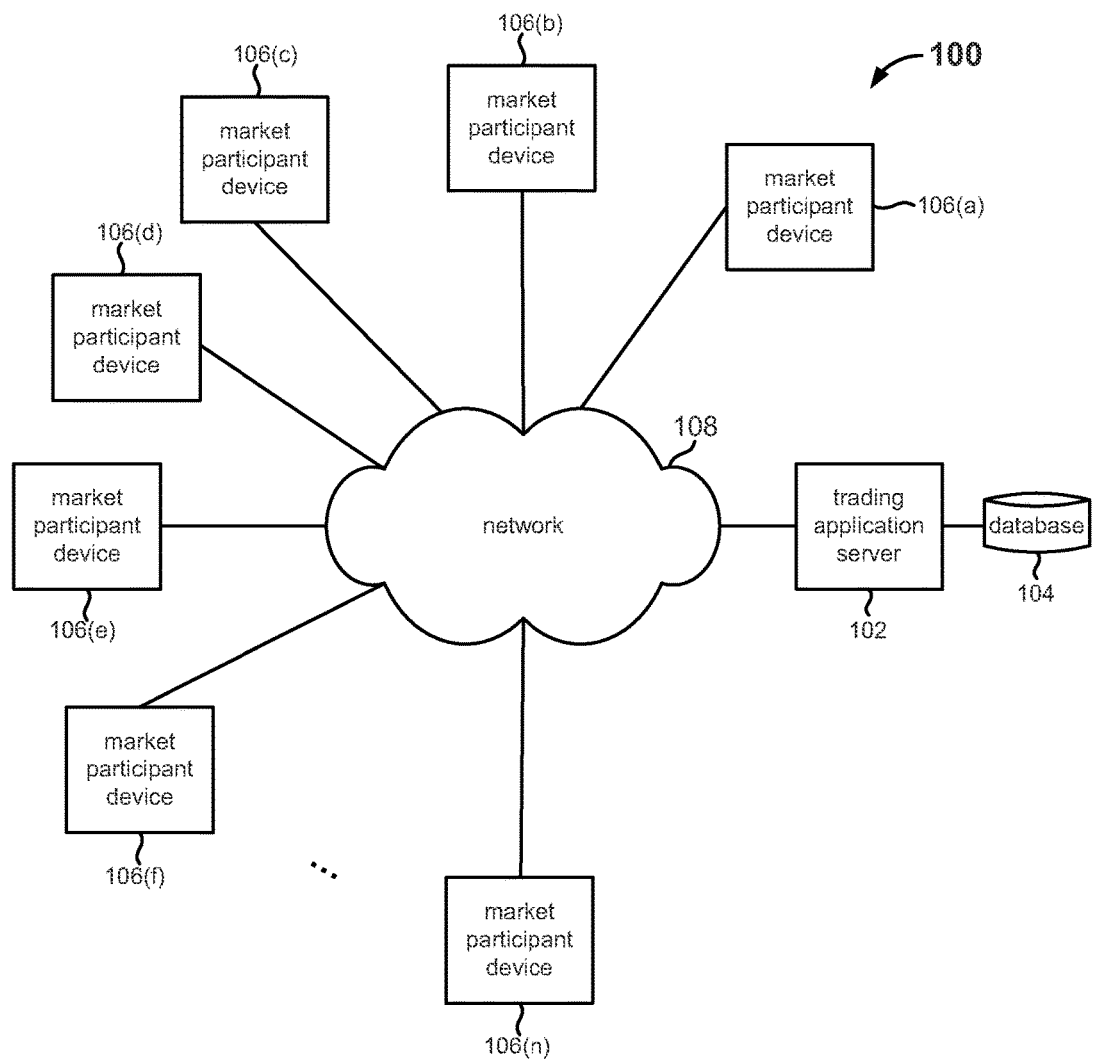
FIG. 1 is a block diagram illustrating an embodiment of a network environment in which a trading application is deployed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A dynamic system for trading money market instruments is disclosed. The described system comprises an electronic marketplace catering to the needs of institutional investors and funding managers. The trading platform comprises a web-based application that provides a real time, consolidated view of a plurality of markets and instruments and facilitates directly linking credit-matched borrowers and investors around the world. Detailed access to current market conditions across multiple instruments provides unprecedented efficiency and market transparency to market participants interested in trades. In addition to market discovery, the web-based trading application provides a real time environment for market participants to transact with credit-matched counterparties according to posted amounts and rates. Moreover, anonymity of counterparties is maintained until a trade is close to consummation. The described platform allows investors interested in loaning money and borrowers interested in liquidity to respectively obtain the best available rates based on current market conditions.

FIG. 1 is a block diagram illustrating an embodiment of a network environment 100 in which a trading application is deployed. The trading application is developed, distributed, and/or managed by the entity comprising server 102. Although depicted as a single block in FIG. 1, server 102 may comprise any number of possibly networked components. For example, server 102 may be a part of a server farm. One or more databases, such as database 104, are populated with market as well as participant data. The trading application is available to a plurality of eligible participants enrolled with the application. A market participant communicates with the trading application via any computing device 106 capable of communicating with server 102, such as a desktop computer, notebook computer, tablet computer, personal or enterprise digital assistant, mobile phone, etc. In various embodiments, a device 106 may include a client-side component of the trading application and/or may access the trading application from server 102 via a web interface such as a web browser. Communication between each of devices 106 and server 102 is facilitated by network 108, which in various embodiments may comprise any combination of one or more public, private, wired, and/or wireless networks, such as the Internet or a cellular network.

Figure 2A:
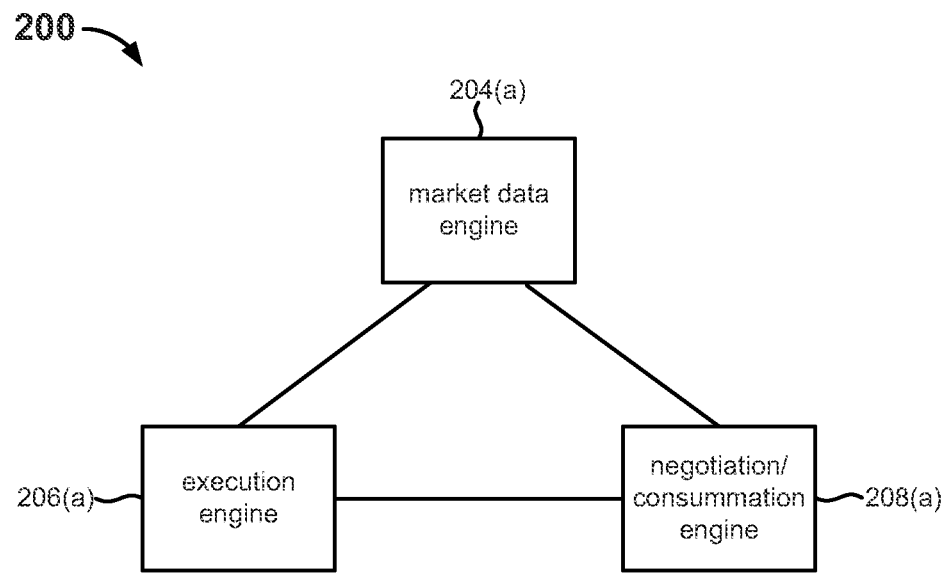
FIG. 2A is a block diagram illustrating an embodiment of components of a trading application.
Figure 2B:
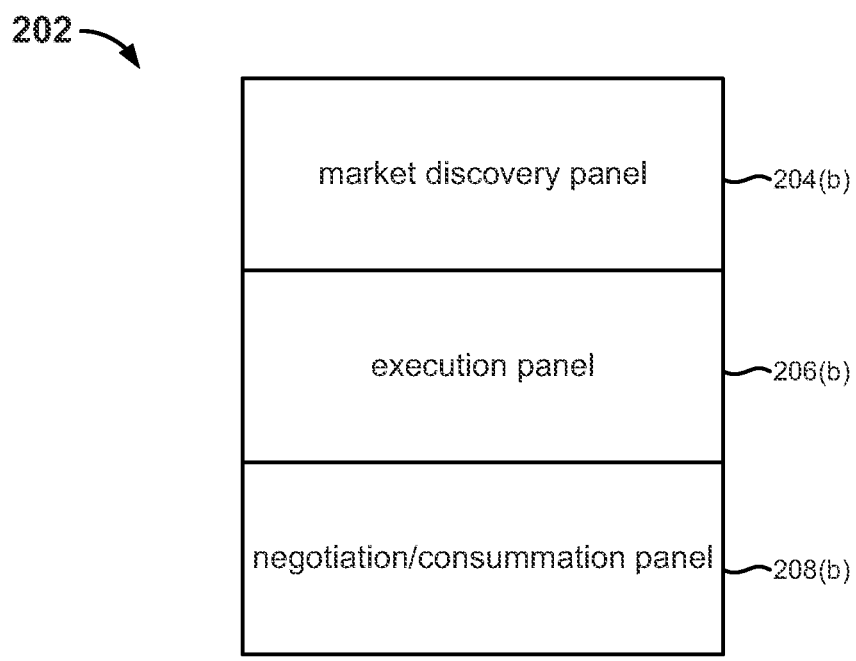
FIG. 2B illustrates an embodiment of an interface of a trading application

FIG. 2A is a block diagram illustrating an embodiment of components of the trading application. The described components, for example, may be a part of server 102 of FIG. 1. In the given example, trading application 200 includes market data engine 204(a), execution engine 206(a), and negotiation/consummation engine 208(a). FIG. 2B illustrates an embodiment of an interface 202 of trading application 200. The interface, for example, may be hosted by server 102 and employed by market participants 106 of FIG. 1 to access and interact with the trading application. As depicted, interface 202 includes a market discovery panel 204(b), an execution panel 206(b), and a negotiation/consummation panel 208(b).

Market data engine 204(a) aggregates and processes market data and presents the data via market discovery panel 204(b) of interface 202. Dynamic real time and/or historic market data for a plurality of markets and instruments is presented by market data engine 204(a) via market discovery panel 204(b). In some embodiments, the market data is presented as yield curves for various money market instruments such as federal funds, time deposits, certificates of deposit, commercial papers, repurchase agreements, etc. The consolidated data presented by market discovery panel 204(b) allows market participants to quickly view and navigate across multiple markets and instruments. In some embodiments, market discovery panel 204(b) is interactive and allows market participants to navigate to a specific market and/or instrument of interest. For example, points along a yield curve presented via market discovery panel 204(*b*) may be clicked or selected to navigate to a particular market and/or instrument.

Execution engine 206(*a*) aggregates and processes detailed data associated with a particular market and/or instrument and presents the data via execution panel 206(*b*), e.g., in response to a selection of the market and/or instrument by a market participant via market discovery panel 204(*b*). For example, buyer and/or seller bids making up a selected market (which may comprise one or more associated instruments) are presented by execution engine 206(*a*) via execution panel 206(*b*). In trading terminology, 'hitting a bid' refers to an offer by a seller (or synonymously a lender or an investor) to sell a prescribed amount of money at a prescribed rate while 'lifting an offer' refers to an offer by a buyer (or synonymously a borrower or a fund manager) to buy a prescribed amount of money at a prescribed rate. Thus, execution panel 206(*b*) provides a consolidated real time view of buyer and/or seller bids comprising a selected market of interest from which trades can be initiated.

In some embodiments, execution engine 206(*a*) comprises a soft credit matching engine capable of identifying credit approved counterparties. In such cases, bids from credit approved counterparties with which a particular market participant can conduct trades may be specially indicated in execution panel 206(*b*). For example, from a particular market participant's view of interface 202, bids from credit approved counterparties may be indicated by a prescribed color in execution panel 206(*b*) while those not approved may be indicated by a different color. In some embodiments, execution panel 206(*b*) is interactive and allows market participants to initiate trades with credit matched counterparties. For example, bids from credit approved counterparties presented to a market participant via execution panel 206(*b*) may be selectable to initiate a trade.

Negotiation/consummation engine 208(*a*) processes data associated with a particular trading transaction between counterparties and presents and/or prompts for data associated with executing the trade via negotiation/consummation panel 208(*b*) of interface 202. In some embodiments, counterparty anonymity is maintained at least until the negotiation/consummation phase of a trade. In some embodiments, the identity of the buyer is revealed to the seller when the trade is initiated so that the seller can determine whether the trade can be consummated. A trade may be accepted by the seller if the buyer has an available credit line for at least the amount of the trade from the seller but may be rejected by the seller if the buyer has already exhausted the buyer's credit line for the given time period or, for instance, if processing the trade is not feasible, e.g., because the trade does not clear through an approved processing center. In some cases in which the buyer does not have sufficient (remaining) credit with the seller for a full amount of a bid, a trade for a partial amount of the bid may be negotiated and/or executed. In some embodiments, the identity of the seller is revealed to the buyer when the seller approves the trade or when the trade is consummated (and may not be revealed at all to the buyer if the seller declines the trade). Thus, negotiation/consummation engine 208(*a*) and panel 208(*b*) provide an interactive interface for executing or canceling a trade initiated between counterparties.

Figure 3:
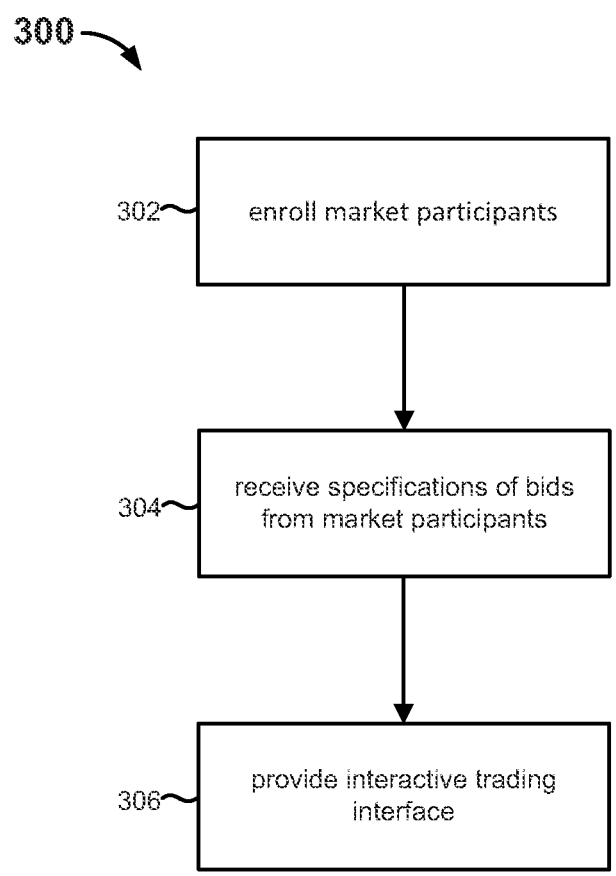
FIG. 3 is a flow chart illustrating an embodiment of a process for providing a trading application.

FIG. 3 is a flow chart illustrating an embodiment of a process for providing a trading application. For example, process 300 may be employed by server 102 of FIG. 1 or trading application 200 of FIG. 2A. Process 300 starts at step 302 at which market participants are enrolled with the trading application. As previously described, a market participant or trader may comprise a buyer interested in borrowing money or a seller interested in investing money. In some cases, a market participant may comprise both a buyer and a seller in different contexts. An eligible market participant may register with the trading application by creating an account with the service. Relevant information about the market participant as well as terms and conditions for trades may be stored with respect to an associated user account, for example, in database 104 of FIG. 1. For example, a market participant may manage and post bids with respect to available instruments and/or markets via an associated user account. Moreover, a market participant may specify via a user account other entities to and/or from which credit lines exist. Such specified credit line information may be employed to determine whether a trade between two counterparties is viable. At step 304, specifications of bids are received from market participants. A bid comprises an offer to buy or sell a prescribed amount of money at a prescribed rate. A market participant may select the amount and/or rate of the bid based on current market trends and may also specify a prescribed instrument and/or market for the bid. Alternatively, in some cases, only an amount and minimum/maximum rate may be specified by the market participant, and an instrument/market that provides the best rate or at least satisfies the specified rate criterion may be automatically selected based on current market conditions. Anonymity of the market participants behind the bids may be maintained until near or actual consummation of a trade. At step 306, an interactive trading interface is provided. For example, interface 202 of FIG. 2B is provided at step 306. Bids received from market participants are posted via the trading interface and are dynamically updated in real time. As described, the trading interface provides a consolidated view across instruments and markets and from the perspectives of market participants facilitates discovery of optimal rates or prices (for buying or selling) based on current and possibly historic market conditions and available credit lines. The trading application provides a marketplace or central meeting place for market participants for both market discovery and live trading. The consolidated market view furthermore facilitates trades agnostic to instruments/markets as well as multiplexing trades across a plurality of instruments/markets. That is, a market participant may conduct trades across any one or more instruments and/or markets as long as the associated rates are acceptable and credit lines are available.

Figure 4:
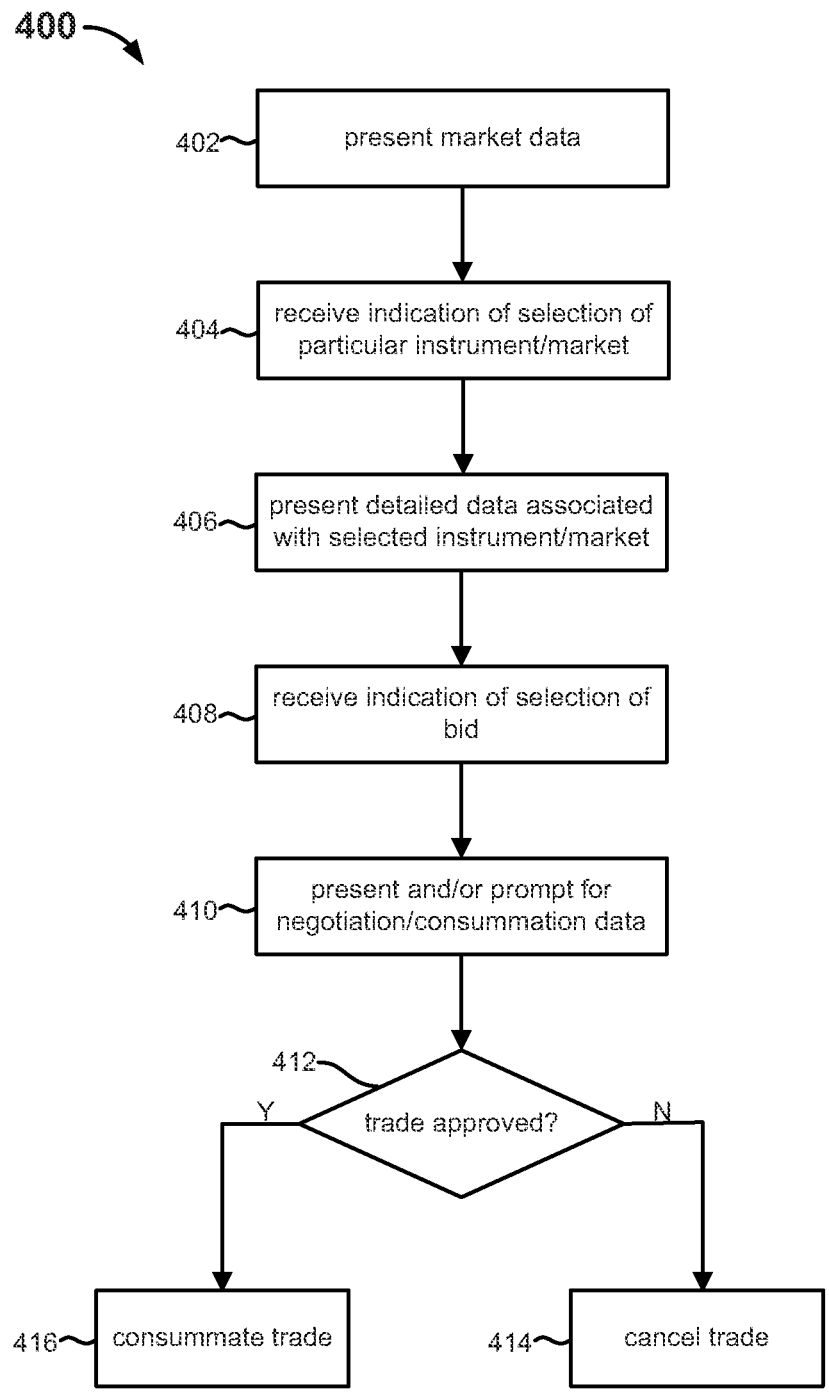
FIG. 4 is a flow chart illustrating an embodiment of a process for providing a trading application.

FIG. 4 is a flow chart illustrating an embodiment of a process for providing a trading application. For example, process 400 may be employed by server 102 of FIG. 1, trading application 200 of FIG. 2A, and/or at step 306 of process 300 of FIG. 3. Process 400 starts at step 402 at which data comprising a plurality of instruments and/or markets is presented, e.g., by market data engine 204(*a*) via market discovery panel 204(*b*). For example, the data presented at step 402 may comprise a consolidated real time global view across one or more instruments and/or markets and may comprise one or more yield curves. At step 404, an indication of a selection of a particular instrument and/or market is received. The indication of step 404 may be received, for example, in response to a click or selection of a selectable point of a yield curve or other selectable option presented at step 402. At step 406, detailed data associated with the selected instrument and/or market is presented, e.g., by execution engine 206(*a*) via execution panel 206(*b*). In some embodiments, a consolidated view of bids from different market participants currently available for the selected instrument and/or market is presented at step 406. The data presentation of the trading application may at least in part be customized for a particular market participant. For example, a counterparty bid presented at step 406 may comprise a visual or other indication indicating whether or not business is feasible between that counterparty and a particular market participant to which the data is being presented. In one example, for instance, bids from credit matched counterparties are rendered in green while bids from other counterparties are rendered in red. In some embodiments, the bids presented at step 406 to a particular market participant may be filtered to show only bids from credit-matched counterparties.

At step 408, an indication of a selection of a bid is received from a market participant. In some embodiments, a trade may only be initiated between credit matched counterparties. At step 410, relevant negotiation/consummation data for finalizing the trade comprising the selected bid is presented to and/or prompted from the buyer and/or seller, e.g., by negotiation/consummation engine 208(*a*) via negotiation/consummation panel 208(*b*). At step 412, it is determined whether the trade has been approved by the seller. For example, at step 412 it is determined whether the seller has selected an option to complete the trade via the negotiation/consummation interface. In some cases, an option presented to the seller to complete the trade may comprise a timeout condition. If the seller does not select the option to complete the trade within the corresponding timeout period, the trade times out and is automatically canceled at step 414. In other embodiments, the trade is canceled at step 414 in response to receiving an explicit selection of an option by the seller to cancel the trade. The trade may be declined by the seller, for example, if the buyer does not have or has already exhausted a credit line to the seller and/or if processing associated with transacting the trade is not feasible, e.g., because the transaction does not clear through an approved center. Step 414 includes generating an error or notification that informs the buyer of the cancelation. If it is determined at step 412 that the seller has selected an option to complete the trade, the trade is consummated at step 416. The trade may be approved by the seller, for example, if the buyer has an available credit line to the seller that has not been already exhausted and/or if processing associated with transacting the trade is feasible. Step 416 includes facilitating transaction processing for transferring funds from the seller to the buyer. In some embodiments, a trade may comprise a partial amount that is less than the full amount posted in the selected bid, e.g., if the buyer negotiates for less than the posted amount and/or if the buyer does not have sufficient credit. In some embodiments, anonymity of the counterparties is maintained until the trade is initiated at step 408, canceled at step 414, and/or consummated at step 416. In some embodiments, for example, the identity of the buyer is revealed to the seller when the trade is initiated at step 408 while the identity of the seller is revealed to the buyer only if the trade is approved by the seller and consummated at step 416. In such cases, the identity of the seller may never be revealed to the buyer if the trade is canceled at step 414. Alternatively, in other cases, the identity of the seller may be revealed to the buyer if the trade is canceled at step 414. In some embodiments, the identities of the seller and the buyer may be bilaterally revealed to both counterparties at step 408 when the trade is initiated.

In some embodiments, the ability to cloak bids is provided. At least partial anonymity of needed or available amounts may be desired, for example, to prevent sellers from extracting extra yields from buyers who need more of their money and to prevent buyers from paying lower yields when sellers have more money available to lend. Hidden or dark quantities may only be revealed during negotiation or after consummation of a trade between counterparties and if both counterparties express an interest in 'going on' or continuing trading, e.g., if both parties have specified dark bids. In some embodiments, revelation of the availability of a dark bid from either side may be based on the identity and/or type of the counterparty.

Figure 5:
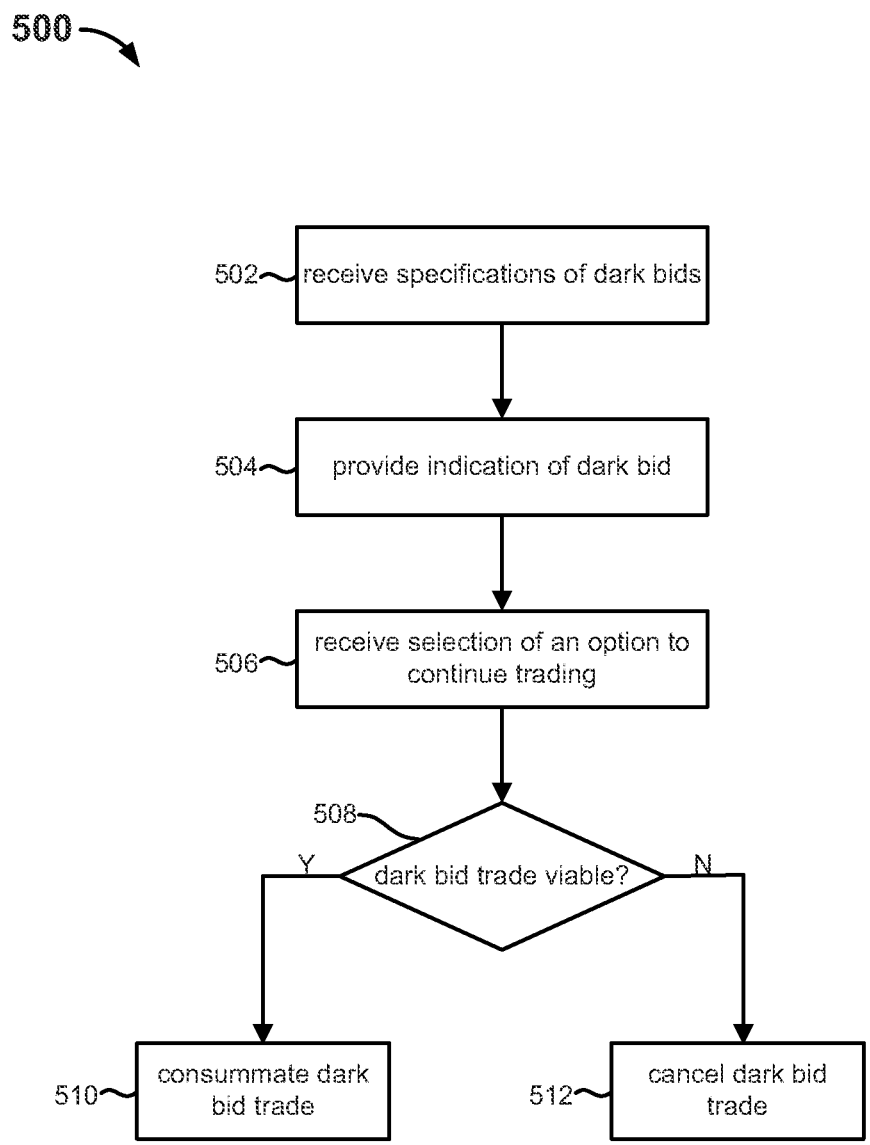
FIG. 5 is a flow chart illustrating an embodiment of a process for continuing trading.

FIG. 5 is a flow chart illustrating an embodiment of a process for continuing trading. For example, process 500 may be employed by server 102 of FIG. 1 or trading application 200 of FIG. 2A. Process 500 starts at step 502 at which specifications of dark bids are received. A dark bid from a buyer specifies an additional amount and/or a rate at which the buyer is willing to further buy from a seller via one or more instruments/markets, and a dark bid from a seller specifies an additional amount and/or a rate at which the seller is willing to further sell to a buyer via one or more instruments/markets. Dark bids may be specified at the same time that published bids are specified or may be specified during negotiation/consummation of a trade. At step 504, an indication that a dark bid is available for further trading is provided, e.g., by negotiation/consummation engine 208(*a*) via negotiation/consummation panel 208(*b*). The indication may be presented to either or both the buyer and seller to indicate that the other party is willing to 'go on' or continue trading and may not reveal the actual amounts either party is willing to further 'go on' for. The indication may comprise a selectable option to 'go on' or continue trading. At step 506, an indication of a selection of an option to 'go on' or continue trading is received, e.g., from the buyer. At step 508, it is determined whether a dark bid trade is viable between the counterparties. If it is determined at step 508 that a dark bid trade is viable, the dark bid trade is consummated at step 510. If it is determined at step 508 that the dark bid trade is not viable, the dark bid trade is canceled at step 512. The dark bid trade is viable, for example, if the dark bid criteria specified by the buyer satisfies the dark bid criteria specified by the seller and if the buyer has sufficient remaining credit available from the seller. In some cases, the dark bid trade may be for a partial amount as long as the rate is acceptable to both parties. For example, if the seller's dark amount is $3B and the buyer's dark amount is $5B, a dark bid trade for $3B is conducted. In this example, if the buyer however has a remaining credit of only $2B with the seller, a dark bid trade for only $2B is conducted. The actual amounts of dark bids specified by the counterparties may never be revealed to maintain confidentiality of each party's top number. A dark bid trade is only conducted if the dark bid criteria (e.g., amounts, rates, instruments, and/or markets) specified by both parties are satisfied. In some embodiments, a plurality of dark bids may be stacked or tiered, and relevant portions of process 500 may be iterated for each dark bid trade. For example, a seller may have a total dark amount of $3.5B and tier dark bids as follows: a first dark bid of $1B at 20 basis points, a second dark bid of $1B at 21 basis points, and a third dark bid of $1.5B at 22 basis points. Moreover, the various dark bids from the seller may be across one or more instruments and/or markets.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for presenting market information relating to, and facilitating trading of, money market instruments, comprising:
   a processor configured to:
      display on a user interface an interactive market discovery panel that is configured to present yield curves representing a plurality of money market instruments via a user interface, wherein the yield curves are dynamically generated and updated by consolidating real time data corresponding to the plurality of money market instruments and the market discovery panel is configured to be interactive such that the presented yield curves comprise a plurality of selectable points which can be selected to navigate to currently available bids corresponding to the money market instruments;
      receive, via the market discovery panel displayed on the user interface, a selection of a selectable point included on a yield curve corresponding to a money market instrument;
      display on the user interface an execution panel that presents a consolidated view of a set of bids determined to be currently available for the money market instrument corresponding to the selectable point that was selected via the market discovery panel;
      receive, via the execution panel displayed on the user interface, a selection of a bid from the set of bids determined to be currently available;
      determine that counterparties associated with the selected bid are credit approved to enable trades to be initiated between the counterparties; and
      display on the user interface a consummation panel that enables the counterparties to confirm or cancel a trade which has been initiated corresponding to the selected bid between the counterparties; and
   a memory coupled to the processor and configured to provide the processor with instructions.

2. The system of claim 1, wherein the processor is further configured to provide historical data corresponding to the plurality of money market instruments via the user interface.

3. The system of claim 1, wherein each of the bids presented in the execution panel are assigned a color that indicates whether or not an associated counterparty is credit approved.

4. The system of claim 1, wherein the set of bids comprises bids from credit matched counterparties as well as bids from counterparties that are not credit matched.

5. The system of claim 1, wherein each bid comprises an amount and a rate.

6. The system of claim 1, wherein available bids are only selectable by credit matched counterparties.

7. The system of claim 1, wherein the determination that counterparties involved in the selected bid are credit approved comprises determining that a buyer counterparty has a credit line from a seller counterparty.

8. The system of claim 1, wherein to consummate the trade comprises to consummate the trade in response to seller approval of the trade.

9. The system of claim 1, wherein the interface facilitates counterparty negotiation of the trade.

10. The system of claim 1, wherein the trade is consummated if a seller in the trade approves the trade within a time out period.

11. The system of claim 1, wherein the trade is consummated for a partial amount that is less than a full amount posted in the selected bid.

12. The system of claim 1, wherein identities of one or both of the counterparties engaged in the trade are not revealed until initiation, negotiation, or consummation of the trade.

13. The system of claim 1, further comprising providing an option for engaging in an additional trade corresponding to dark bids specified by the counterparties, wherein at least a maximum amount available for trade associated with each dark bid is hidden from the opposing counterparty.

14. The system of claim 1, wherein the plurality of money market instruments comprises two or more of federal funds, time deposits, certificates of deposit, commercial papers, and repurchase agreements.

15. A method for presenting market information relating to, and facilitating trading of money market instruments, comprising using a processor for:
   displaying on a user interface an interactive market discovery panel that is configured to present yield curves representing a plurality of money market instruments via a user interface, wherein the yield curves are dynamically generated and updated by consolidating real time data corresponding to the plurality of money market instruments and the market discovery panel is configured to be interactive such that the presented yield curves comprise a plurality of selectable points which can be selected to navigate to currently available bids corresponding to the money market instruments;
   receiving, via the market discovery panel displayed on the user interface, a selection of a selectable point included on a yield curve corresponding to a money market instrument;
   displaying on the user interface an execution panel that presents a consolidated view of a set of bids determined to be currently available for the money market instrument corresponding to the selectable point that was selected via the market discovery panel;
   receiving, via the execution panel displayed on the user interface, a selection of a bid from the set of bids determined to be currently available;
   determining that counterparties associated with the selected bid are credit approved to enable trades to be initiated between the counterparties; and
   displaying on the user interface a consummation panel that enables the counterparties to confirm or cancel a trade corresponding to the selected bid between the counterparties which has been initiated.

16. A computer program product embodied in a non-transitory computer readable storage medium and comprising computer instructions for presenting market information relating to, and facilitating trading of money market instruments, wherein the program instructions, when executed on a computer, cause the computer to:
   display on a user interface an interactive market discovery panel that is configured to present yield curves representing a plurality of money market instruments via a user interface, wherein the yield curves are dynamically generated and updated by consolidating real time data corresponding to the plurality of money market instruments and the market discovery panel is configured to be interactive such that the presented yield curves comprise selectable points to navigate to corresponding currently available bids corresponding to the money market instruments;
   receive, via the market discovery panel displayed on the user interface, a selection of a selectable point included on a yield curve corresponding to a money market instrument;

display on the user interface an execution panel that presents a consolidated view of a set of bids determined to be currently available for the money market instrument corresponding to the selectable point that was selected via the market discovery panel;

receive, via the execution panel displayed on the user interface, a selection of a bid from the set of bids determined to be currently available;

determine that counterparties associated with the selected bid are credit approved to enable trades to be initiated between the counterparties; and display on the user interface a consummation panel that enables the counterparties to confirm or cancel a trade which has been initiated corresponding to the selected bid between the counterparties.

* * * * *